(12) United States Patent
Carnevali

(10) Patent No.: US 8,235,340 B2
(45) Date of Patent: Aug. 7, 2012

(54) PORTABLE AVIATION CLAMP

(76) Inventor: Jeffrey D. Carnevali, Seattle, WA (US)

(\*) Notice: Subject to any disclaimer, the term of this patent is extended or adjusted under 35 U.S.C. 154(b) by 651 days.

(21) Appl. No.: 12/217,245

(22) Filed: Jul. 2, 2008

(65) Prior Publication Data
US 2008/0295301 A1 Dec. 4, 2008

Related U.S. Application Data

(63) Continuation-in-part of application No. 11/809,281, filed on May 31, 2007.

(51) Int. Cl.
*B25B 5/00* (2006.01)

(52) U.S. Cl. .......... 248/231.71; 269/143; 269/249; 29/276; 29/257

(58) Field of Classification Search .......... 248/230.6, 248/228.6, 229.25, 229.15, 231.71, 316.3; 24/600.7; 269/143, 249; 29/276, 257
See application file for complete search history.

(56) References Cited

U.S. PATENT DOCUMENTS

| | | | | |
|---|---|---|---|---|
| 74,897 A * | 2/1868 | Covert | ............ | 24/600.7 |
| 154,399 A * | 8/1874 | King | ............ | 248/231.71 |
| 215,246 A * | 5/1879 | Sargent | ............ | 24/600.7 |
| 288,774 A * | 11/1883 | Chase | ............ | 24/600.7 |
| 1,047,029 A * | 12/1912 | Fox | ............ | 29/276 |
| 1,365,559 A * | 1/1921 | Starks | ............ | 29/257 |
| 1,372,431 A * | 3/1921 | Husi | ............ | 248/231.71 |
| 1,717,106 A * | 6/1929 | Holt | ............ | 248/231.71 |
| 2,477,270 A * | 7/1949 | Smith | ............ | 29/257 |
| 2,549,429 A * | 4/1951 | Cowles | ............ | 29/257 |
| 2,650,788 A * | 9/1953 | Hulstein | ............ | 248/231.71 |
| 2,867,003 A * | 1/1959 | Stiles | ............ | 249/82 |
| 2,920,665 A * | 1/1960 | Hutson | ............ | 269/88 |
| 3,234,634 A * | 2/1966 | Johnson et al. | ............ | 29/243.54 |
| 4,233,730 A * | 11/1980 | Godbe | ............ | 29/727 |
| 4,977,660 A * | 12/1990 | Maynard | ............ | 29/251 |
| 5,148,590 A * | 9/1992 | Wu | ............ | 29/257 |
| 5,156,430 A * | 10/1992 | Mori | ............ | 294/82.23 |
| 5,228,737 A * | 7/1993 | Zimmerman | ............ | 296/76 |
| 5,713,117 A * | 2/1998 | Bliss | ............ | 29/257 |
| 5,733,061 A * | 3/1998 | Child | ............ | 403/385 |
| 5,850,680 A * | 12/1998 | Verrier et al. | ............ | 29/257 |
| 2006/0278785 A1* | 12/2006 | Wiesner et al. | ............ | 248/231.71 |
| 2007/0137008 A1* | 6/2007 | Anstee | ............ | 24/600.7 |

\* cited by examiner

*Primary Examiner* — Terrell McKinnon
*Assistant Examiner* — Ingrid M Weinhold
(74) *Attorney, Agent, or Firm* — Charles J. Rupnick, Attorney at Law

(57) ABSTRACT

A spring-loaded clamp device including a C-shaped frame having first and second substantially opposing arms interconnected by an intermediate shank, the first arm having a substantially hollow carrier sleeve aligned substantially along a clamping direction oriented substantially transverse of the second arm, and the second arm having a thin and flat anvil portion positioned opposite from the carrier sleeve and further comprising an interior clamping surface that is oriented substantially transverse of the clamping direction. A clamping rod is carried in the hollow of the sleeve for longitudinal movement in the clamping direction toward an internal face of the second arm and in an opposite unclamping direction away from the second arm. An expansive biasing member is coupled for expanding the clamping rod for longitudinal movement along the clamping direction.

19 Claims, 12 Drawing Sheets

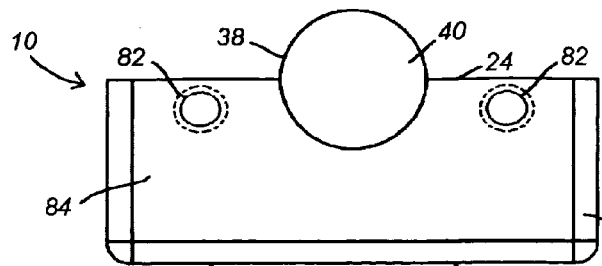
Fig. 6
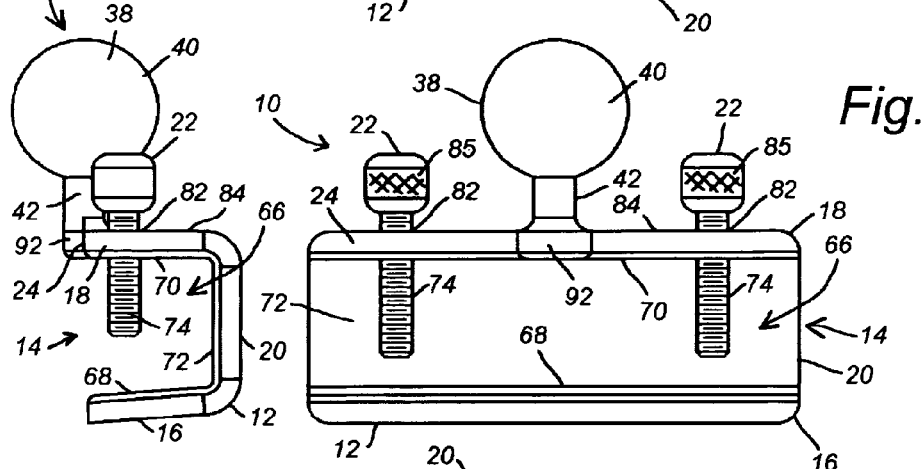
Fig. 7
Fig. 8
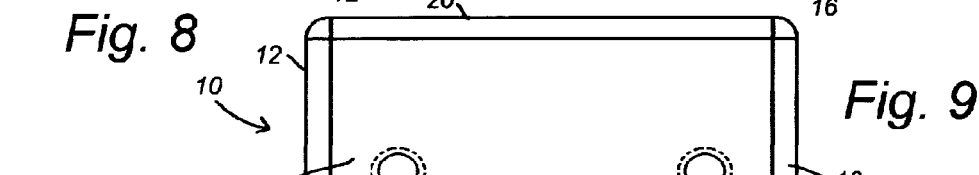
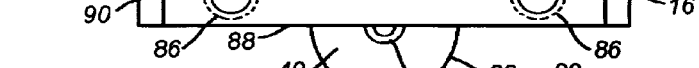
Fig. 9
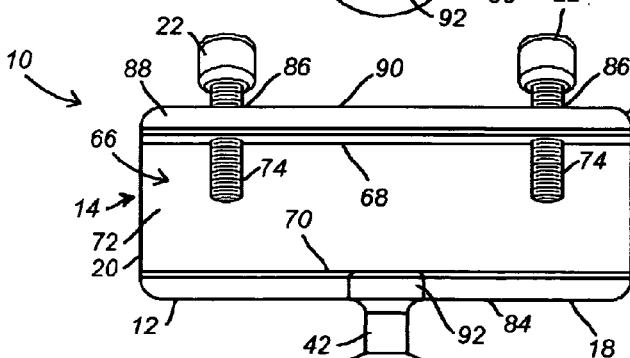
Fig. 10
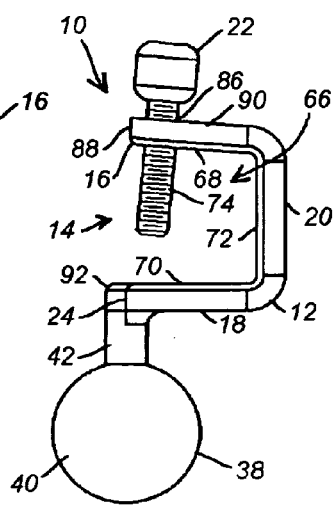
Fig. 11

PORTABLE AVIATION CLAMP

This application is a Continuation-in-part and claims priority benefit of copending parent U.S. patent application Ser. No. 11/809,281 filed in the name of Jeffrey D. Carnevali on May 31, 2007, the complete disclosure of which is incorporated herein by reference.

FIELD OF THE INVENTION

The present invention relates generally to clamps for holding portable devices, and in particular to portable C-clamps for use with ball-and-socket connectors in aviation environments having both cylindrical and rectilinear mounting surfaces.

BACKGROUND OF THE INVENTION

Display space on the control panel of an aircraft is limited by the physical dimensions of the cockpit and the number of instruments displayed on the control panel is limited by the physical size of the instrument's display which must be large enough to be easily read by the crew. These control panel space constraints limit the number of instruments available on the control panel of any aircraft, from the small private airplane to the large commercial airliners. For example, current private airplanes are typically equipped with a standard avionics package that includes a pair of radios and a pair of navigation receivers. The control panel is filled with engine instrument displays, airplane control displays and navigation/voice radio displays. No room exists on the control panel for map displays, such as those that use information from a global positioning system (GPS). Although larger and carrying more instruments, commercial airliners suffer similar space constraints. Similar constraints also limit the number of instruments which can be displayed on the control panel of a land or water-based vehicle, i.e., the dash board of an automobile or a boat. In such situations display space is a premium.

Because display space is a premium, instrument panels generally do not provide space for redundancy, i.e., back-up displays for any or all flight critical instruments. Nor is space available for additional flight information. Thus, as current technology provides new information sources, for example, the GPS position information, the instrument display must compete with the existing instruments for space on the control panel. Some of the new technology products provide critical flight safety information which must somehow be provided to the crew. Additionally, pilots must routinely consult pre-flight check lists, flight charts, approach plates, and other flight information documents, while operating the aircraft. For example, during landing pilots generally prefer to have an approach plate or map in plain view for easy reference.

Examples of efforts to provide additional display space include such products as so called "lap boards." Lap boards, as described in U.S. Design Pat. No. 317,788, AVIATION LAP BOARD, are literally boards strapped to the pilot's leg which provide an extra flat surface for holding maps for reference during flight or landing. However, the pilot is forced to continually look down at the lap board to read the documents which interrupts attention to the instruments and windshield. Another example is the clip board mounted to the column of the aircraft control yoke described in each of U.S. Pat. No. 4,969,623, FLIGHT DOCUMENTS ORGANIZER and U.S. Pat. No. 5,441,229, HOLDER FOR ASSEMBLAGE OF PILOT FLIGHT CHARTS. U.S. Pat. No. 3,809,338, TIMER AND APPROACH PLATE HOLDER FOR AIRCRAFT describes such a clip board, incorporating a chronometer, which mounts by a spring clip onto the yoke column. U.S. Pat. No. 5,222,690, VEHICULAR DESK OR INFORMATION DISPLAY, describes another such clip board, incorporating a video display, which again mounts by a clamp onto the yoke column. Other clip boards are know which are designed to mount directly onto the control yoke, either as a removable attachment or as an integral part of the control yoke (no examples found). The described control column and yoke mounted clip boards provide the pilot with an easily viewable display.

Presently, pilots often temporarily mount the approach map, or another aeronautical chart or flight information document, like a recipe card on the clip board. However, while pilots need to comfortably and effectively consult these documents in a timely fashion as the need arises, such maps and documents tend to obscure other critical flight instruments and engine and fuel monitoring instruments on the control panel. Also, these documents tend to become awkward and unwieldy when too large to conveniently fit on the clip board. Some further disadvantages of control column mounted clip boards are that they are costly for many private pilots and that small aircraft manufacturers cannot provide these useful displays because their temporary nature does not allow for certification.

Other examples of efforts to provide additional display space include suction cup clamp devices. Suction cup clamp devices, as described in U.S. Pat. No. 6,666,420, SUCTION CUP HAVING COMPACT AXIAL INSTALLATION AND RELEASE MECHANISM, invented by the inventor of the disclosed invention, which is incorporated herein by reference, are clamps that provide additional display space by mounting to smooth cockpit surfaces, such as the front or side windscreens. Suction cup clamp devices may include means for mounting the resiliently compressible ball-shaped coupler described in U.S. Pat. No. 5,845,885, UNIVERSALLY POSITIONABLE MOUNTING DEVICE, invented by the inventor of the disclosed invention, which is incorporated herein by reference. However, suction cup clamp devices may have limited value in mounting electronics devices as, under certain circumstances, ambient light tends to wash out images on display screens, especially liquid crystal display (LCD) screens.

Thus, to date, whether an air, land or water-based vehicle, cockpit display space remains severely limited.

SUMMARY OF THE INVENTION

The present invention is a novel spring-loaded C-clamp device that overcomes limitations of the prior art for providing additional display volume for cockpit instrumentation, and a method of operating the novel clamp device, which includes a method of operating the novel clamp device for other useful purposes.

According to one aspect of the novel clamp device, the clamp device includes a C-shaped frame formed of first and second substantially opposing arms interconnected by an intermediate shank portion therebetween, the first arm further being formed with a substantially hollow carrier sleeve aligned substantially along a clamping direction oriented substantially transverse of the second arm, and the second arm further being formed with a thin and flat anvil portion positioned opposite from the carrier sleeve and further comprising an interior clamping surface that is oriented substantially transverse of the clamping direction. A clamping rod is carried in the hollow of the sleeve for longitudinal movement in the clamping direction toward an internal face of the second arm and in an opposite unclamping direction away from the second arm. An expansive biasing member is coupled for expanding the clamping rod for longitudinal movement along the clamping direction. A part-spherical coupler is projected on a stem from an external portion of the frame.

According to another aspect of the novel clamp device, the clamp device further includes a guide mechanism that is structured for guiding the clamping rod for longitudinal movement in the clamping and unclamping directions.

According to another aspect of the novel clamp device, the guide mechanism further includes a keyway and mating key coupled between the shank portion of the C-shaped frame and the clamping rod.

According to another aspect of the novel clamp device, the clamping rod further includes a longitudinal bore substantially aligned along the clamping and unclamping directions, and a first end portion of the expansive biasing member residing substantially therein.

According to another aspect of the novel clamp device, the first arm further includes a stationary guide positioned within the hollow of the carrier sleeve, and a second opposite end portion of the expansive biasing member being positionally coupled to the guide.

According to another aspect of the novel clamp device, the second arm further includes a clearance aperture therethrough and substantially aligned with the clamping and unclamping directions and sized to receive the clamping rod therethrough.

According to another aspect of the novel clamp device, the C-shaped frame further includes a longitudinal slot formed therethrough between the first and second arms and substantially intersecting the keyway of the guide mechanism; and the clamping rod further includes an actuator received through the longitudinal slot formed through the C-shaped frame and sized to slide there along.

According to another aspect of the novel clamp device, the actuator further includes a stem portion sized to slide along the longitudinal slot of the C-shaped frame, the actuator being coupled to the clamping rod.

According to another aspect of the novel clamp device, the clamp device further includes means for adjusting a position of the actuator along the clamping rod between first and second end portions thereof.

According to another aspect of the novel clamp device, a novel method of clamping is provided wherein the method includes: interconnecting first and second substantially opposing arms into a C-shaped frame and forming a throat portion of the frame therebetween, in the first arm further forming a substantially hollow carrier sleeve aligned substantially along a clamping direction oriented substantially transverse of the second arm, and in the second arm further forming a thin and flat anvil portion positioned opposite from the carrier sleeve and further forming an interior clamping surface thereon that is oriented substantially transverse of the clamping direction, and projecting a part-spherical coupler from a portion of the frame external of the throat portion. The method of clamping further includes, in a hollow of the carrier sleeve, carrying a clamping rod for longitudinal movement in the clamping direction toward the internal face of the second arm and in an opposite unclamping direction away from the second arm; positioning a target mounting structure in the throat portion of the frame between a forward clamping surface of the clamping rod and the internal face of the second arm; resiliently expanding the clamping rod longitudinally along the clamping direction; and compressively clamping the target mounting structure between the forward clamping surface of the clamping rod and the internal face of the second arm.

According to another aspect of the novel method of clamping, the method of clamping further includes guiding the clamping rod relative to the hollow of the carrier sleeve.

According to another aspect of the novel method of clamping, the portion of the method that includes carrying a clamping rod in the hollow of the carrier sleeve further includes inserting the clamping rod into the hollow of the carrier sleeve through a clearance aperture formed through the second arm and substantially aligned with the clamping direction.

According to another aspect of the novel method of clamping, the portion of the method that includes resiliently expanding the clamping rod further includes coupling an actuator to the clamping rod through a longitudinal slot in the frame; and the method further includes adjustably positioning the actuator relative to the clamping rod along the clamping direction.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a top elevation view of the novel clamp device having a pair of thumb screws removed for clarity, and showing a pair of threaded holes formed in a portion thereof on opposites sides of a ball-end coupler having a resiliently deformable part-spherical head;

FIG. 7 is a back elevation view of the novel clamp device including the pair of thumb screws;

FIG. 8 is a side elevation view of the novel clamp device including the pair of thumb screws;

FIG. 9 is a bottom elevation view of the novel clamp device including a pair of threaded holes formed in a portion thereof opposite from the ball-end coupler, this pair of threaded holes being either in combination with, or in substitution for, the threaded holes formed on either side of the ball-end coupler;

FIG. 10 is a back elevation view of the novel clamp device including a pair of thumb screws threaded into the pair of threaded holes formed opposite from the ball-end coupler;

FIG. 11 is an opposite side elevation view of the novel clamp device including a pair of thumb screws threaded into the pair of threaded holes formed opposite from the ball-end coupler;

DETAILED DESCRIPTION OF PREFERRED EMBODIMENT

In the Figures, like numerals indicate like elements.

Figure 1:
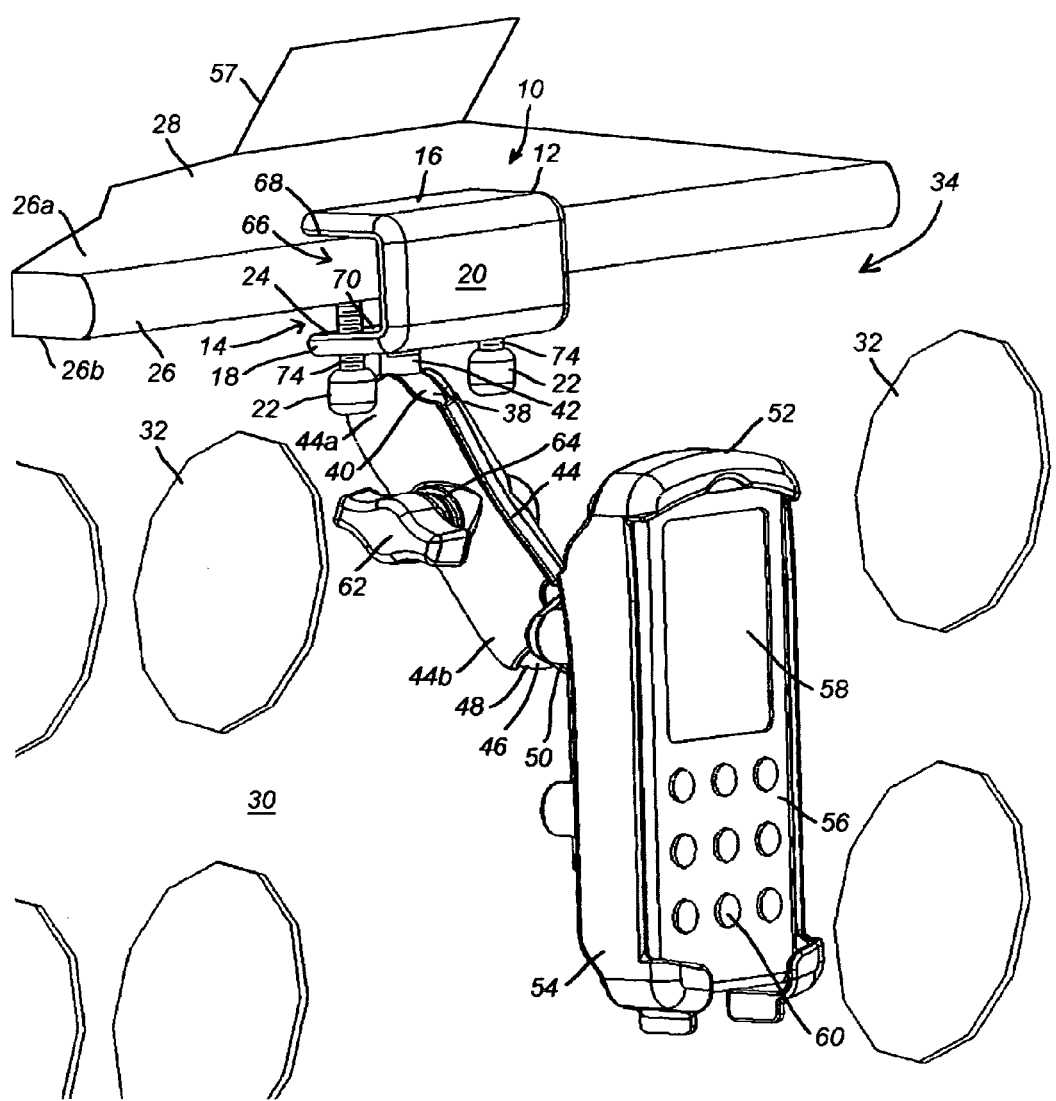
FIG. 1 is a perspective view illustrating a novel clamp device and showing an example of a method of operating the novel clamp device disclosed herein.

FIG. 1 is a perspective view showing an example of a method of operating a novel clamp device 10 of the type disclosed herein. The clamp device 10 is formed of a substantially rigid elongated jaw portion 12 forming an elongated and substantially uniform mouth opening 14 thereinto between opposing upper and lower plates 16 and 18 spaced apart by an opposing backing plate portion 20. The upper and lower plates 16, 18 and backing plate 20 are illustrated here by example and without limitation as substantially identical uniformly long, flat and relatively thin rigid plates. The backing plate 20 is optionally a thicker plate than the upper and lower plates 16, 18 and may be curved, without deviating from the scope and intent of the present invention. A pair of thumb screws 22 is spaced apart along the elongated jaw portion 12. The thumb screws 22 are threaded into the mouth opening 14 adjacent to an outer lip portion 24 of the lower plate 18. The lower plate 18 having the thumb screws 22 thus operates as a drive plate, while the opposing upper plate 16 operates as an anvil. The jaw portion 12 of the clamp device 10 is, for example, fit over any jutting structure of the vehicle which the mouth opening 14 is sized to receive thereinto. By example and without limitation, the mouth opening 14 is fit over an edge protrusion 26 of a cockpit dashboard 28 jutting beyond and overhanging an instrument panel 30, as is common in boats, planes and automobiles to shade instruments 32 from dome lights inside the vehicle cockpit. The dashboard 28 is typically at or below window level so that the edge protrusion 26 also shades the instrument panel 30 from ambient sunlight. The instrument panel 30 and instruments 32 mounted thereon are thus in an area (generally indicated at 34) of the cockpit normally substantially cast into shadow by the overhanging edge protrusion 26 of the dashboard 28.

A ball-end mount or "coupler" 38 with a resiliently deformable part-spherical head 40 and formed thereon is extended from the lower plate 18 on a reduced diameter columnar stem or "neck" 42 relatively upstanding thereon adjacent to the outer lip portion 24 between the thumb screws 22. Positioning the ball-end coupler 38 on the same lower plate 18 with the thumb screws 22 is not a necessary requirement of the clamp device 10; however, such relative positioning ensures the thumb screws 22 will be available for tightening when the ball-end coupler 38 is positioned in a useful place relative to the dashboard 28 or other available vehicle cockpit structure. For example, the upper plate 16 is optional slipped into a narrow slot between a rigid pocket panel and a door panel that may be wide enough to admit the slim upper plate 16, but too narrow to admit the longer thumb screws 22 or the users' digits for tightening them. Thus, colocating the ball-end coupler 38 in common with the thumb screws 22 on the same lower plate 18 is only the most versatile configuration of the clamp device 10. Furthermore, positioning the ball-end coupler 38 adjacent to the outer lip portion 24 of the lower plate 18 is not a necessary requirement of the clamp device 10; however, such relative positioning ensures the ball-end coupler 38 is removed as far as possible into the shadowed area 34 cast by the edge protrusion 26 of the cockpit dashboard 28.

The ball-end coupler 38 is, by example and without limitation, the coupler having the resiliently deformable part-spherical head as described in U.S. Pat. No. 5,845,885, which is incorporated herein by reference. Any of the hand held portable instruments or documents, such as flight information documents, useful to a boat, plane or automobile pilot may be usefully suspended from the clamp device 10. By example and without limitation, a substantially rigid split-arm socket assembly 44 of the type disclosed by example and without limitation in U.S. Pat. No. 5,845,885, which is incorporated herein above by reference, is rotatably coupled at a first socket end 44a to the part-spherical head 40 of the coupler 38 portion of the clamp device 10. A second socket end 44b of the split-arm socket assembly 44 is coupled to a second resiliently deformable part-spherical head 46 of a second ball-end mount or coupler 48 which is extended from a second reduced diameter stem or "neck" 50 relatively upstanding on a useful cockpit accessory 52, illustrated here by example and without limitation as an instrument tray 54 holding a portable electronic instrument 56, such as a GPS.

The novel clamp device 10 is, by example and without limitation, clamped to the edge protrusion 26 of the cockpit dashboard 28 with the ball-end coupler 38 projected into the shadowed area 34 cast by the edge protrusion 26. Furthermore, the first and second socket ends 44a, 44b of the split-arm socket assembly 44 cooperate with the first and second ball-end couplers 38, 48, respectively, to position the instrument tray 54 below level of a windscreen 57. Cooperation of the ball-end coupler 38 of the clamp device 10 with the split-arm socket assembly 44 and second ball-end coupler 48 furthermore permits positioning of the instrument tray 54 such that view of the instruments 32 is not obscured. With the instrument tray 54 so positioned relative to the dashboard edge protrusion 26, the position and orientation of the instrument 56 are adjusted until a lightable display screen 58 and keypad 60 (if present) of the instrument 56 are appropriately positioned in the shadowed area 34 cast by the cockpit dashboard 28 yet out of line-of-sight of instruments 32 on the instrument panel 30, and the display screen 58 and keypad 60 (if present) are appropriately oriented for viewing. The display screen 58 and keypad 60 (if present) are thus cast into shadow that ambient light does not wash out images displayed thereon. The instrument 56 is thus readable at a glance, even when the display screen 58 is of the LCD variety, but does not interfere with viewing the permanent cockpit instruments 32.

When the instrument 56 is appropriately positioned with the display screen 58 and keypad 60 (if present) in the shadowed area 34 cast by the cockpit dashboard 28, a knob 62 portion of a clamping mechanism 64 is tightened relative to the split-arm assembly 44, which effectively interlocks its first and second socket ends 44a, 44b with the first and second ball-end couplers 38, 48, respectively, to retain the selected positioning.

Figure 2:
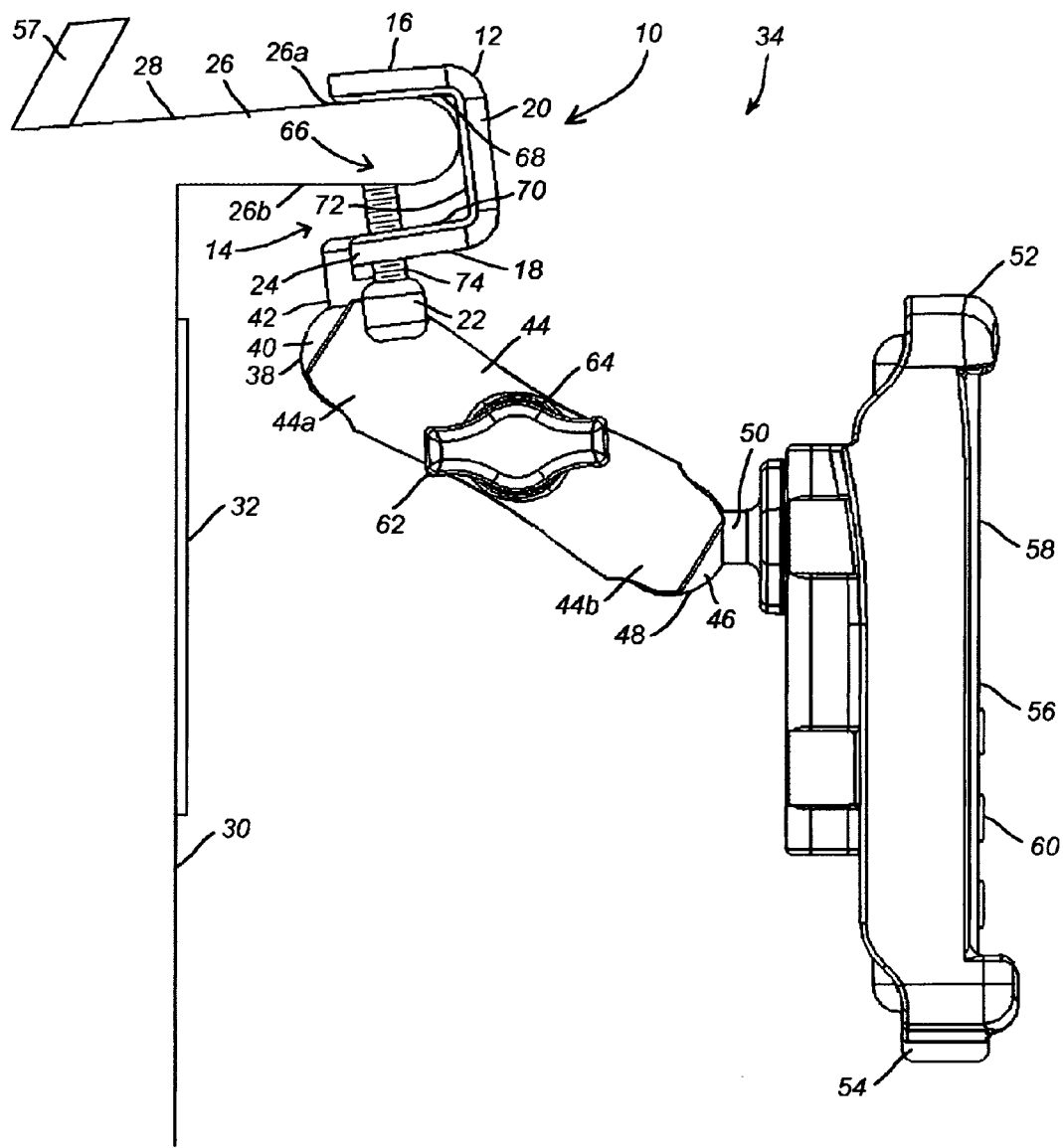
FIG. 2 is a side view more clearly showing the novel clamp device and the example of a method of operating the device, as illustrated in FIG. 1.

FIG. 2 is a side view more clearly showing the clamp device 10 clamped to the edge protrusion 26 of the cockpit dashboard 28 with the ball-end coupler 38 projected into the shadowed area 34 of the cockpit. As illustrated here, while not a necessary requirement of the clamp device 10, relative positioning the ball-end coupler 38 adjacent to the outer lip portion 24 of the lower plate 18 ensures the ball-end coupler 38 is removed as far as possible into the shadowed area 34 cast by the edge protrusion 26 of the cockpit dashboard 28. Furthermore, colocating the ball-end coupler 38 in common with the thumb screws 22 on the same lower plate 18 is illustrated here as being unnecessary to operation of the clamp device 10. However, such common positioning of the ball-end coupler 38 with the thumb screws 22 remains the most versatile configuration of the clamp device 10.

Here, the clamp device 10 is shown more clearly having the mouth opening 14 of the jaw portion 12 wrapped around the cockpit dashboard 28 so the edge protrusion 26 is extended deep into a substantially rectangular throat portion 66 formed between respective substantially planar inner surfaces 68 and 70 of the upper and lower jaw plates 16 and 18. The dashboard edge protrusion 26 is shown here butted against a substantially planar inner surface 72 of the backing plate portion 20. The upper plate 16 of the clamp device 10 is shown more clearly having the inner jaw surface 68 secured against an upper surface 26a of the cockpit dashboard edge protrusion 26. Threaded shafts 74 of the thumb screws 22 inserted through the lower plate 18 are driven against an under surface 26b of the cockpit dashboard edge protrusion 26 to secure the inner jaw surface 68 of the upper plate 16 against the upper cockpit dashboard edge protrusion surface 26a for holding the clamp device 10 in the selected position relative to the cockpit dashboard 28.

Figure 3:
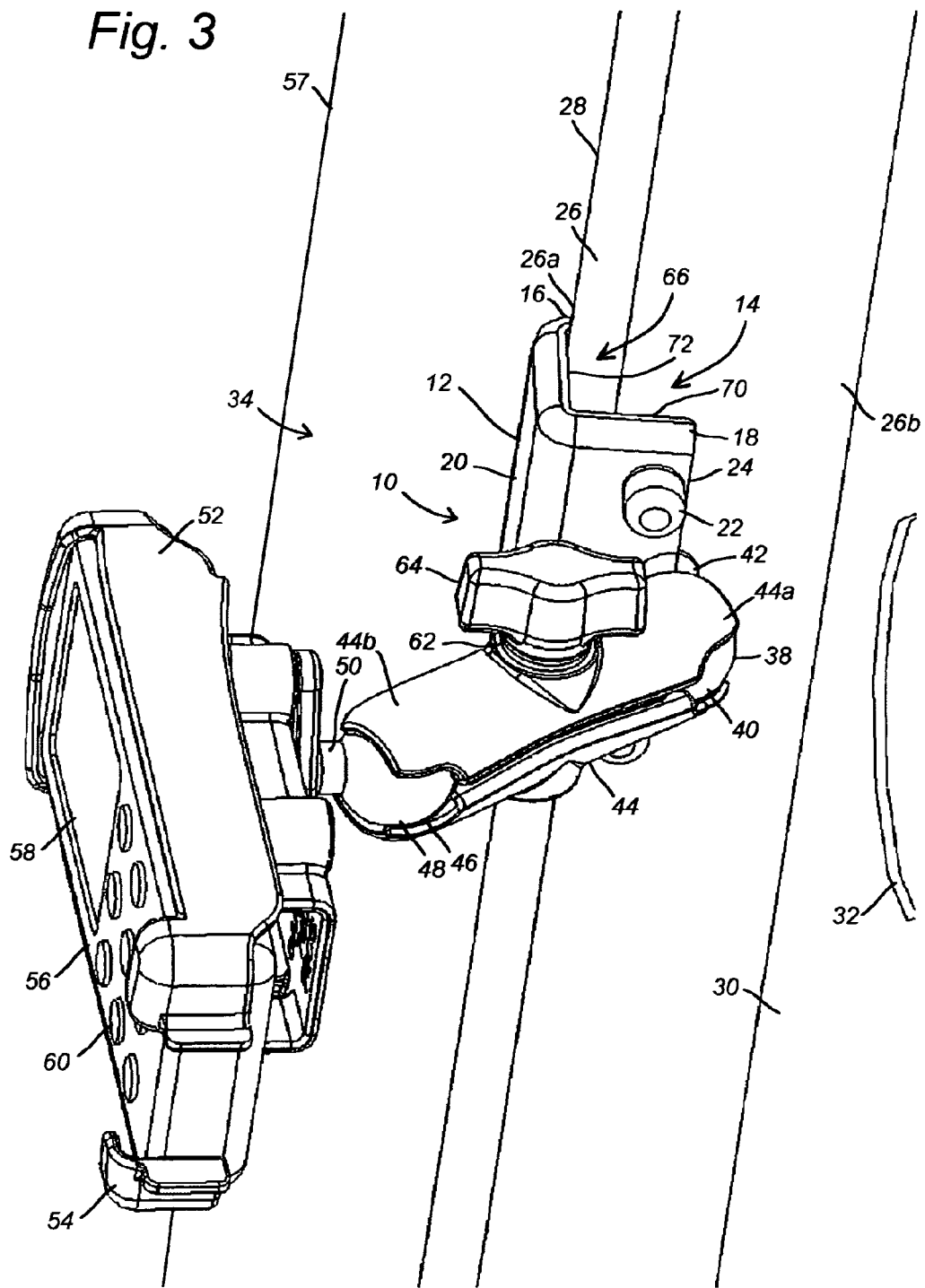
FIG. 3 is a bottom perspective view looking up at the novel clamp device and the example of a method of operating the device, as illustrated in FIG. 1.

FIG. 3 is a bottom perspective view looking up at the clamp device 10 from the shadowed area 34 under the overhanging edge protrusion 26 of the cockpit dashboard 28. Here, the lower plate 18 is more clearly shown having the ball-end coupler 38 projected therefrom between the two spaced apart thumb screws 22.

Figure 4:
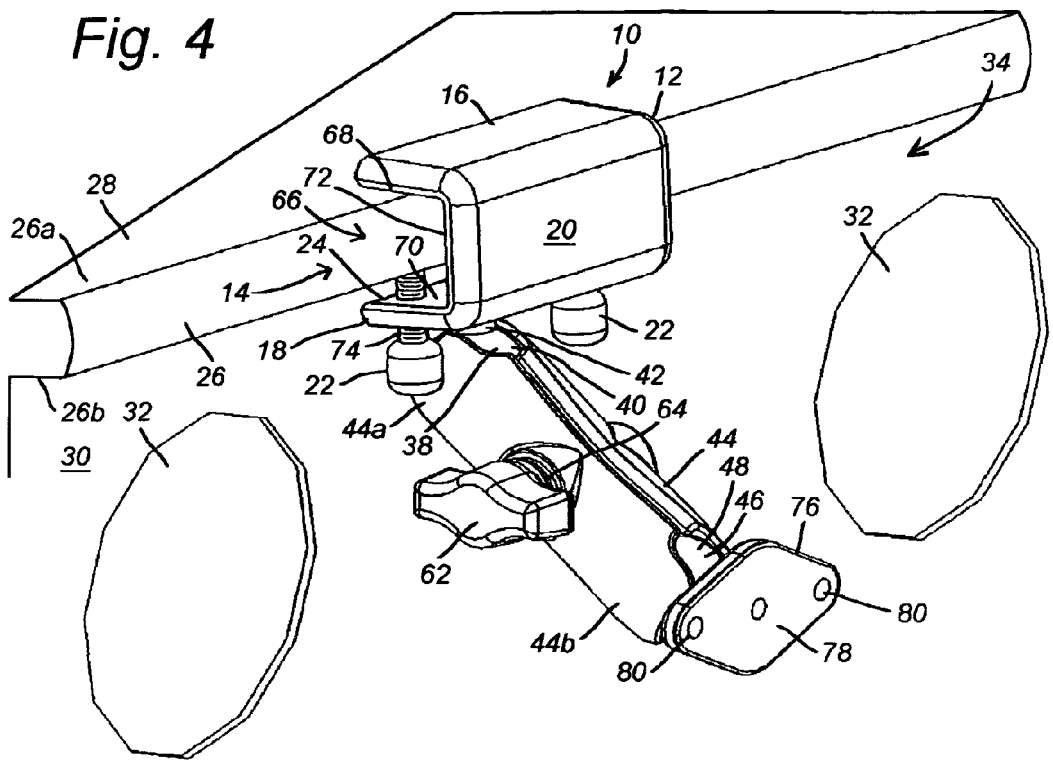
FIG. 4 is a perspective view illustrating the novel clamp device mounted on the edge protrusion of a cockpit dashboard with a ball-end coupler thereof oriented downward into an area shadowed by the dashboard.

FIG. 4 is a perspective view showing the clamp device 10 mounted on the edge protrusion 26 of the cockpit dashboard 28 with the ball-end coupler 38 oriented downward into the shadowed area 34. The clamp device 10 is illustrated here in combination with the cooperating split-arm socket assembly 44 and second ball-end coupler 48, as described herein. Here, the second ball-end coupler 48 is projected from a generic mounting plate 76 structured with a substantially planar mounting surface 78 having spaced apart mounting holes 80 therethrough. Such mounting plates 76 may be used to mount the instrument tray 54, as illustrated herein by example and without limitation.

Figure 5:
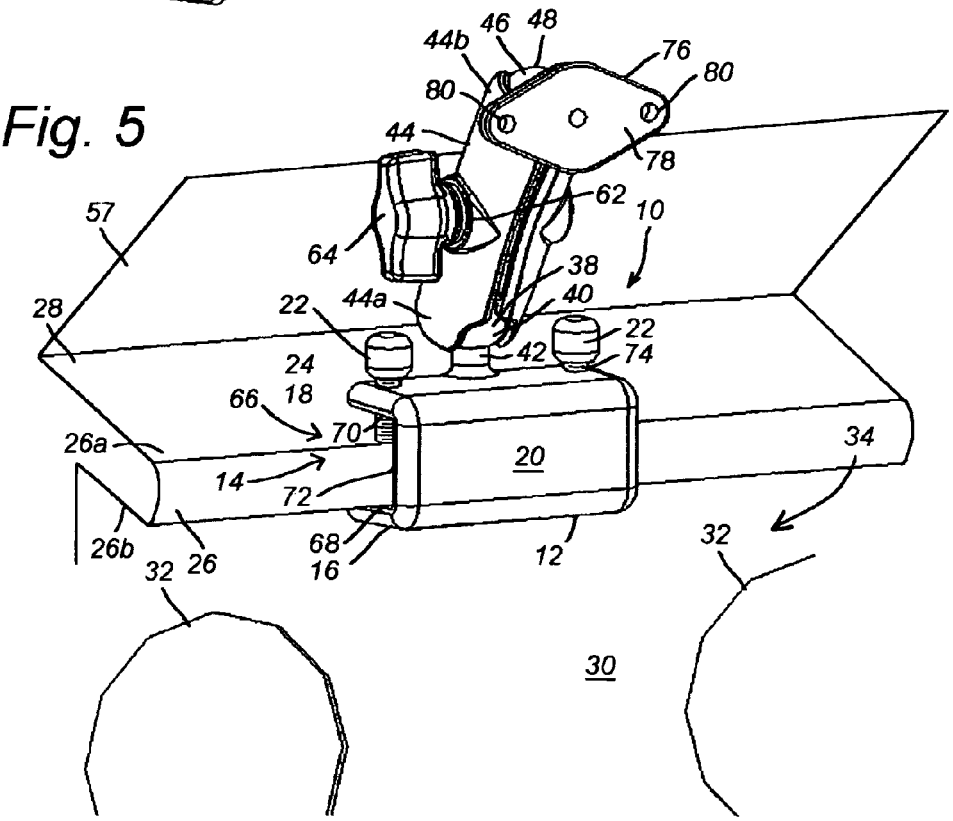
FIG. 5 is a perspective view illustrating the novel clamp device mounted on the edge protrusion of a cockpit dashboard with a ball-end coupler thereof oriented upward into an area above the dashboard.

FIG. 5 is a perspective view showing the clamp device 10 mounted on the dashboard edge protrusion 26 with the ball-end coupler 38 oriented upward above the cockpit dashboard 28. This orientation may be appropriate, for example, for holding paper documents in a lighted portion of the cockpit outside the shadowed area 34 for easier reading.

FIG. 6 is a top elevation view of the clamp device 10 wherein the thumb screws 22 are removed to more clearly show a pair of threaded holes 82 spaced apart along the outer lip portion 24 of the lower jaw plate 18 of the elongated jaw portion 12. The threaded holes 82 extend through the lower jaw plate 18 between a substantially planar outer surface 84 and the inner surface 70. The thumb screws 22 are threaded into the mouth opening 14 through the threaded holes 82 of the lower jaw plate 18. However, as discussed herein above, the thumb screws are optionally provided through the upper jaw plates 16 wherefore the threaded holes 82 are rather formed through the upper jaw plate 16, without deviating from the scope and intent of the present invention.

FIG. 7 is a back elevation view of the clamp device 10 wherein the thumb screws 22 are spaced apart on opposite sides of the ball-end coupler 38. As illustrated here, the threaded shafts 74 of the thumb screws 22 are optionally sized shorter than the mouth opening 14 when threaded through the lower jaw plate 18. The intended use of the novel clamp device 10 is for being fitted over the edge protrusion 26. The edge protrusion 26 has a finite minimum thickness. Therefore, the thumb screws 22 do not need to span the entire width between the upper and lower jaw plates 16, 18. Rather, the thumb screws 22 need only reach far enough to engage the edge protrusion 26 for securing the clamp device 10 thereto. Accordingly, thumb screws 22 with threaded shafts 74 shorter than the full span of the throat 66 project less above the jaw plate 18 external of the jaw portion 12 than would longer thumb screws 22. Thus, although threaded shafts 74 of the thumb screws 22 shorter than the full span of the throat 66 are not a necessary requirement of the clamp device 10, such feature ensures the most streamlined structure relative to the jaw portion 12.

Furthermore, in contrast to the square power threads and T-handle typical of C-clamps and vices, the thumb screws 22 are conventional thumb screws having the shafts 74 threaded with ordinary unified standard screw threads. Heads 85 of the thumb screws 22 are optionally formed with knurling or another anti-slip configuration typical of conventional thumb screws.

FIG. 8 is a side elevation view of the clamp device 10. Here, the jaw portion 12 is illustrated as having the upper jaw plate 16 being nonparallel or angularly canted relative to the lower jaw plate 18 which is substantially square with the backing plate 20. Alternatively, only the substantially planar inner surface 68 of the upper jaw plate 16 is angularly canted relative to the inner surface 70 of the lower jaw plate 18. Accordingly, the mouth opening 14 is wider than the inner surface 72 of the backing plate portion 20. The throat portion 66 thus forms a shallow right triangle truncated at its narrow end by the backing plate 20. Optionally, both the upper and lower jaw plates 16, 18 are canted relative to the backing plate 20 such that they form an isosceles triangle truncated at its narrow end by the backing plate 20.

Furthermore, the thumb screws 22 are position adjacent to the outer lip portion 24 of the lower plate 18, which permits the clamp device 10 to engage and grip even narrow ledges that may not be deep enough to reach the backing plate 20.

FIG. 9 is a bottom elevation view of the clamp device 10 showing the resiliently deformable part-spherical head 40 of the ball-end coupler 38 over the upper jaw plate 16. Here, the upper jaw plate 16 of the elongated jaw portion 12 optionally includes another pair of threaded holes 86 spaced apart along an outer lip portion 88 of the upper jaw plate 16. The threaded holes 86 extend through the upper jaw plate 16 between a substantially planar outer surface 90 and the inner surface 68. Optionally, the thumb screws 22 are threaded into the mouth opening 14 through the optional threaded holes 86 of the upper jaw plate 16, whereby the upper jaw plate 16 operates as the drive plate, while the lower jaw plate 18 operates as the anvil. The pair of threaded holes 86 through the upper jaw plate 16 of the elongated jaw portion 12 are optionally provided either in combination with the threaded holes 82 through the lower jaw plate 18, or in lieu of the threaded holes 82. Thus, elongated jaw portion 12 optionally has either one or both pair of the threaded holes 82 and 86 through the respective lower and upper jaw plates 18 and 16, without departing from the spirit and scope of the invention.

Additionally, as illustrated here by example and without limitation, the lower plate 18 further includes a small ledge protrusion 92 projected from the outer lip portion 24 substantially coplanar therewith and approximately centered relative to both the mouth opening 14 and the threaded holes 86. The reduced diameter stem 42 is formed with approximately one-half its diameter on the outer lip portion 24 of the lower plate 18, and one-half on the small protrusion 92. Positioning the stem 42 partially on the protrusion 92 causes the ball-end coupler 38 to be partially extended beyond the outer lip portion 24 of the lower plate 18, which effectively increases displacement of the ball-end coupler 38 as far as possible into the shadowed area 34 cast by the edge protrusion 26 of the cockpit dashboard 28. The small protrusion 92 beyond the outer lip portion 24 of the lower plate 18 is not a necessary requirement of the clamp device 10; however, such feature ensures the most extreme relative positioning the ball-end coupler 38 relative to the jaw portion 12.

FIG. 10 is a back elevation view of the clamp device 10 wherein the upper jaw plate 16 is structured having the optional pair of threaded holes 86 therethrough, either in combination with, or in substitution for, the threaded holes 82 through the lower jaw plate 18. Here, the thumb screws 22 are threaded through the optional pair of threaded holes 86. The thumb screws 22 are thus in the upper jaw plate 16 opposite from the ball-end coupler 38.

FIG. 11 is an opposite side elevation view of the clamp device 10 having the thumb screws 22 are threaded through the optional pair of threaded holes 86 in the upper jaw plate 16 opposite from the ball-end coupler 38.

Figure 12:
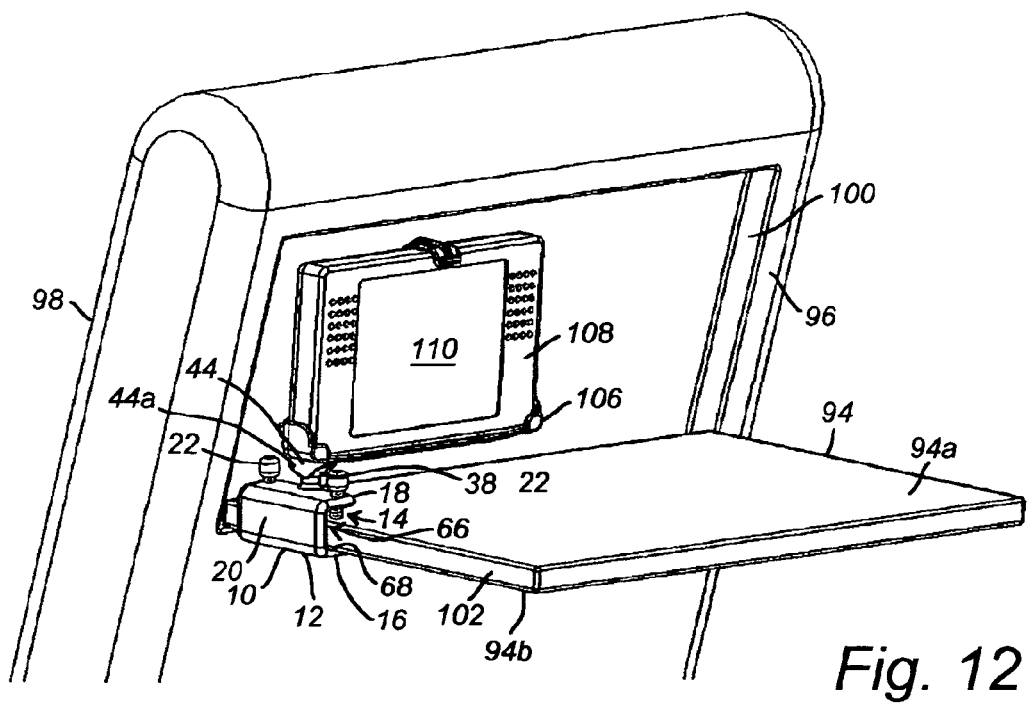
FIG. 12 illustrates another method of operating the novel clamp device as an aviation clamp for use with a fold-out tray table in a deployed configuration relative to a seat back of a forward seat, for example an airplane seat, although this is optionally the forward seat of a modern automobile or pleasure boat.

FIG. 12 illustrates another method of operating the clamp device 10 as an aviation clamp. Here, the clamp device 10 is secured to a fold-out tray table 94 in a deployed configuration relative to a seat back 96 of a forward seat 98, for example an airplane seat, although this is optionally the forward seat of a modern automobile or pleasure boat. Such a fold-out tray table 94 is often sized to seat at least partially within a complementary recess 100 formed in the seat back 96. The mouth opening 14 and throat 66 of the jaw portion 12 is fitted over an edge portion 102 of the tray table 94, which is illustrated in this example in a folded-out configuration. The clamp device 10 is oriented here by example and without limitation with the ball-end coupler 38 extended above a working surface 94a of the tray table 94. The thumb screws 22 secure the clamp device 10 in position by squeezing the inner surface 68 of the upper jaw plate 16 against a backside 94b of the tray table 94. For example, the clamp device 10 is used in combination with the combination with the cooperating split-arm socket assembly 44 and second ball-end coupler 48, as described herein, to hold another instrument tray 106 holding another portable electronic instrument 108, such as a portable computer or DVD player for in-flight viewing of its display screen 110.

Figure 13:
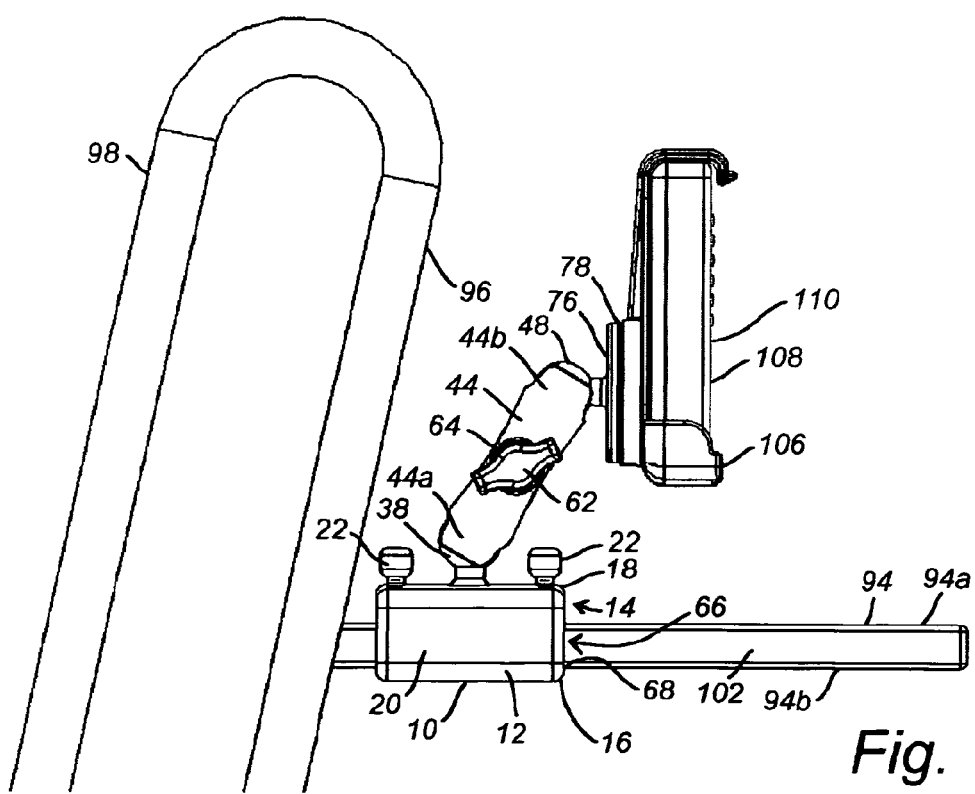
FIG. 13 is a front view of the novel clamp device secured by the thumb screws to an edge portion of the deployed fold-out tray table, as illustrated in FIG. 12.

FIG. 13 is a front view of the clamp device 10 secured by the thumb screws 22 to the edge portion 102 of the deployed fold-out tray table 94, as described herein above. The clamp device 10 is illustrated here by example and without limitation as cooperating with the split-arm socket assembly 44 and second ball-end coupler 48, as described herein, for holding instrument tray 106 for in-flight viewing of the portable electronic instrument 108.

Figure 14:
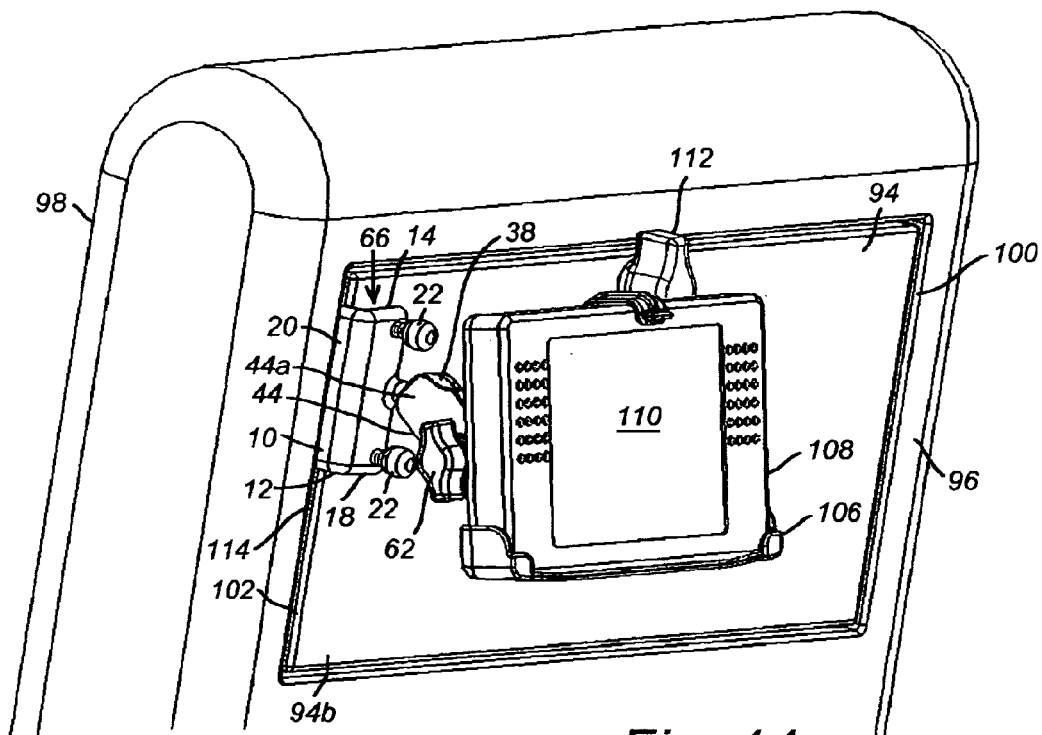
FIG. 14 illustrates another method of operating the novel clamp device as an aviation clamp for use with a fold-out tray table while stored in an upright and locked configuration relative to the seat back of the forward seat.

FIG. 14 illustrates yet another method of operating the clamp device 10 as an aviation clamp. Here, the clamp device 10 is secured to the fold-out tray table 94 stored in an upright and locked configuration relative to the seat back 96 of the forward seat 98, for example an airplane seat, although this is optionally the forward seat of a modern automobile or pleasure boat. The mouth opening 14 of the jaw portion 12 is fitted over the edge portion 102 of the tray table 94. Here, the clamp device 10 is oriented here by example and without limitation with the ball-end coupler 38 extended above the backside surface 94b of the tray table 94. The thumb screws 22 secure the clamp device 10 in position by squeezing the inner surface 68 of the upper jaw plate 16 against the working surface 94a of the tray table 94. Here, the novel shape of the jaw portion 12 of the clamp device 10 is used to good advantage. As discussed herein, the upper plate 16 is slim to fit into narrow passages. Here, the slim upper plate 16 is thin enough that it does not interfere with closure of the tray table 94 against the seat back 96 of the forward seat 98, and even permits securing a tray table locking knob 112, while in the clamp device 10 remains secured to the tray table edge portion 102.

Furthermore, as discussed herein, the backing plate 20 is slender such that it fits in a narrow gap 114 between the tray table edge portion 102 and the seat back 96 when the tray table 94 is fit into the complementary recess 100. A conventional C-clamp design does not permit closure of the tray table 94 into the confined space of the complementary recess 100. Rather, conventional C-clamp type devices generally have a thin flat anvil plates disposed on a thick stiffener formed by a heavy strong back between the anvil and the threaded drive head holding the threaded drive rod. Typically, the strong back must be thick to adequately support the force generated by the drive rod. Here, the thumb screws 22 are conventional thumb screws, in contrast to the square power threads and T-handle typical of C-clamps and vices. The threaded shafts 74 of the conventional thumb screws 22 have ordinary unified standard screw threads and knurled heads 85 (more clearly shown in earlier Figures). Optionally, the thumb screws 22 are plastic or nylon screws to avoid scratching clamping surfaces. Thus, the forces generated by tightening the thumb screws 22 are minimal as compared with conventional C-clamp devices because the clamp device 10 is expected to support minimal loads.

Thus, the clamp device 10 is used in combination with the combination with the cooperating split-arm socket assembly 44 and second ball-end coupler 48, as described herein, to hold the portable computer, DVD player or other portable electronic instrument 108 in the instrument tray 106 with its display screen 110 positioned for in-flight viewing, even when the tray table 94 is stored in its upright and locked position relative to the seat back 96.

Figure 15:
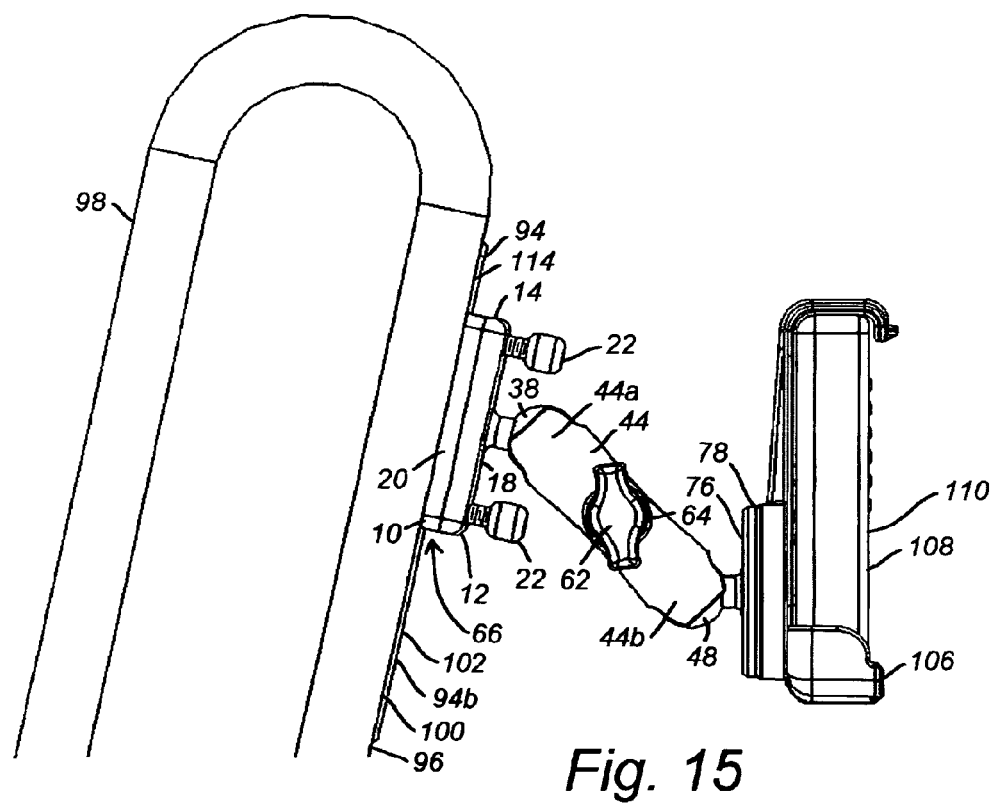
FIG. 15 is a front view of the novel clamp device secured by the thumb screws to an edge portion of the deployed fold-out tray table while stored in its upright and locked position relative to the seat back, as illustrated in FIG. 14.

FIG. 15 is a front view of the clamp device 10 secured by the thumb screws 22 to the edge portion 102 of the tray table 94 while stored in its upright and locked position relative to the seat back 96, as described herein above. The clamp device 10 is illustrated here by example and without limitation as cooperating with the split-arm socket assembly 44 and second ball-end coupler 48, as described herein, for holding instrument tray 106 for in-flight viewing of the portable computer, DVD player or other portable electronic instrument 108.

C-Clamp Device

Figure 16:
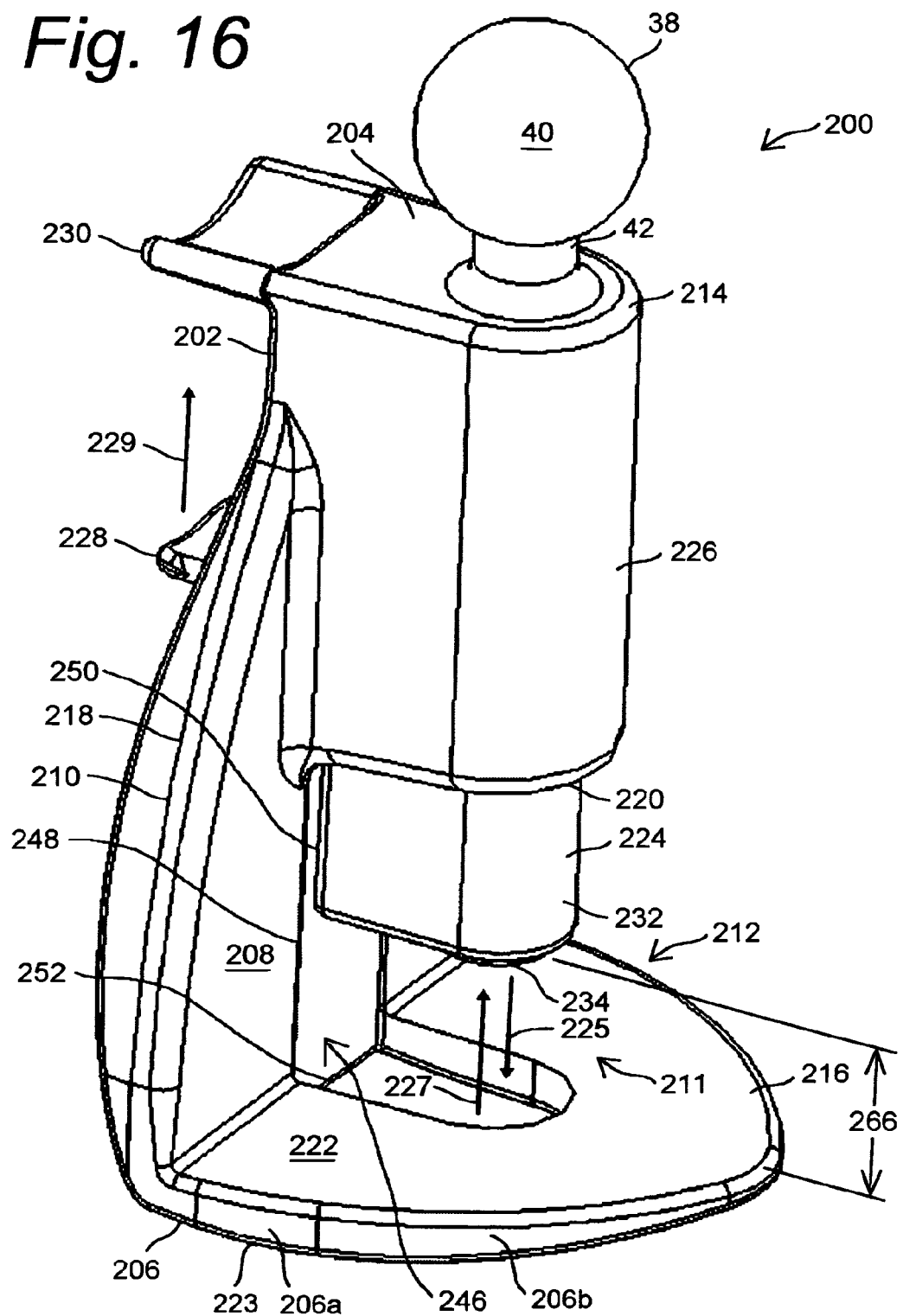
FIG. 16 illustrates an alternative spring-loaded C-clamp device of the present invention.

FIG. 16 illustrates an alternative spring-loaded C-clamp device 200 of the present invention having a substantially C-shaped frame 202 formed of first and second substantially opposing interconnected arms 204 and 206 with an inside 208 encompassed between the arms and an opposite outside 210. The first and second opposing arms 204, 206 form an opening 211 into a throat 212 between their respective free ends 214 and 216. The first and second opposing arms 204, 206 may either be continuous with one another or they may be joined by a stiff intermediate shank portion 218. These opposing first and second arms 204, 206 are optionally substantially parallel each to the other. The respective free ends 214 and 216 of the first and second arms 204, 206 are formed with respective opposing internal surfaces 220 and 222 each positioned on the inside 208 of the C-shaped frame 202 and facing substantially inwardly of the throat 212. The internal surface 222 of the second arm 206 is substantially facing the opposing internal surface 220 of the opposite first arm 204. Furthermore, the second arm 206 is slim to fit into narrow passages. For example, the second arm 206 is formed with a thin and substantially flat anvil 206a having the internal surface 222 spaced only slightly away from a substantially parallel external surface 223. The free end 216 of the second arm 206 may be extended further outwardly from the thin and flat anvil portion 206a into a tongue portion 206b which operates to stabilize the C-clamp device 200 in operation. The tongue portion 206b of the second arm 206 may taper (shown) away from the main anvil portion 206a.

The alternative spring-loaded C-clamp device 200 includes the ball-end mount or "coupler" 38 with the resiliently deformable part-spherical head 40 formed thereon and extended from the outside 210 of the C-shaped frame 202 transversely thereof on the reduced diameter columnar stem or "neck" 42 and relatively upstanding thereon. The coupler 38 is optionally positioned between the arms 204, 206 opposite from the throat 212. When the shank portion 218 of the frame 202 is present, the coupler 38 is optionally positioned thereon approximately intermediate between the arms 204, 206.

Positioning the ball-end coupler 38 on the shank portion 218 of the frame 202 is not a necessary requirement of the alternative spring-loaded C-clamp device 200. However, as discussed herein below, such relative positioning ensures the coupler 38 will be out of the way of operating the device 200 and still be positioned in a useful place relative to the dashboard 28 or other available vehicle cockpit structure. Other positioning of the ball-end coupler 38 is also anticipated and may be may be substituted without deviating from the scope and intent of the present invention. For example, the ball-end coupler 38 may be positioned elsewhere along the shank portion 218 of the frame 202 than intermediate between the arms 204, 206, or may be positioned on the outside 210 of the first arm 204 (shown) or second arm 206, without deviating from the scope and intent of the present invention.

A spring-driven clamping rod 224 is movably carried in a sleeve 226 formed on the first arm 204 for longitudinal movement in a first clamping direction 225 extended toward and oriented substantially transverse of the internal surface 222 of the opposing second arm 206, and in an opposite second unclamping direction 227 retracted away from the opposing second arm 206 substantially along the first clamping direction 225. This longitudinal movement of the clamping rod 224 along the first clamping direction 225 is preferably achieved by expansively spring-loading the clamping rod 224 relative to the first opposing arm 204. Accordingly, the clamping rod 224 is spring-loaded in the sleeve 226 for normal movement in the first clamping direction 225 extended toward the opposing second arm 206, and is retractable in the opposite second unclamping direction 227 against spring force away from the opposing second arm 206.

The longitudinal movement of the clamping rod 224 along the opposite second unclamping direction 227 is preferably achieved by operation of an actuator 228 which is provided, by example and without limitation, as a trigger coupled to the clamping rod 224. For example, the actuator trigger 228 is urged toward the first arm 204, as indicated by arrow 229. A stationary reaction structure 230 is optionally provided for ease of operation of the actuator trigger 228. For example, the stationary reaction structure 230 is provided as an anvil on the first arm 204 opposite from the actuator trigger 228. The actuator trigger 228 is operated by squeezing against spring force toward the stationary anvil reaction structure 230, as indicated by arrow 229.

The clamping rod 224 is formed with a foot portion 232 opposite from the internal surface 222 of the second arm 206, the foot portion 232 having a forward clamping surface 234 facing the internal surface 222. The foot portion 232 is structured for compressively contacting its forward clamping surface 234 with one surface of a target mounting structure during a clamping operation of the spring-loaded C-clamp device 200, while the internal surface 222 of the second arm 206 operates as an anvil for the opposite surface of the target mounting structure to rest against. Formed in the manner described above, the spring-driven clamping rod 224 is forcibly projected from the internal surface 220 of the first arm 204 for longitudinal movement in the first clamping direction 225 toward the internal anvil surface 222 of the second arm 206 for compressively clamping of the target mounting structure therebetween.

The forward clamping surface 234 of the foot portion 232 of the movable clamping rod 224 is further optionally fitted with a clamping pad 236. The clamping pad 236 is optionally partially recessed in to the optionally substantially planar forward clamping surface 234, as illustrated herein. Furthermore, by example and without limitation, the clamping pad 236 is optionally a protective pad formed of a non-marring material such as a nylon, Teflon®, silicone or other elastomeric material. Alternatively, the clamping pad 236 is optionally a friction or non-slip pad formed of a sand paper or with a knurled or other rough surface. Optionally, the clamping pad 236 is formed of a silicone or other elastomeric material that is both a non-marring material as well as a high friction non-slip material.

Figures 17, 18:
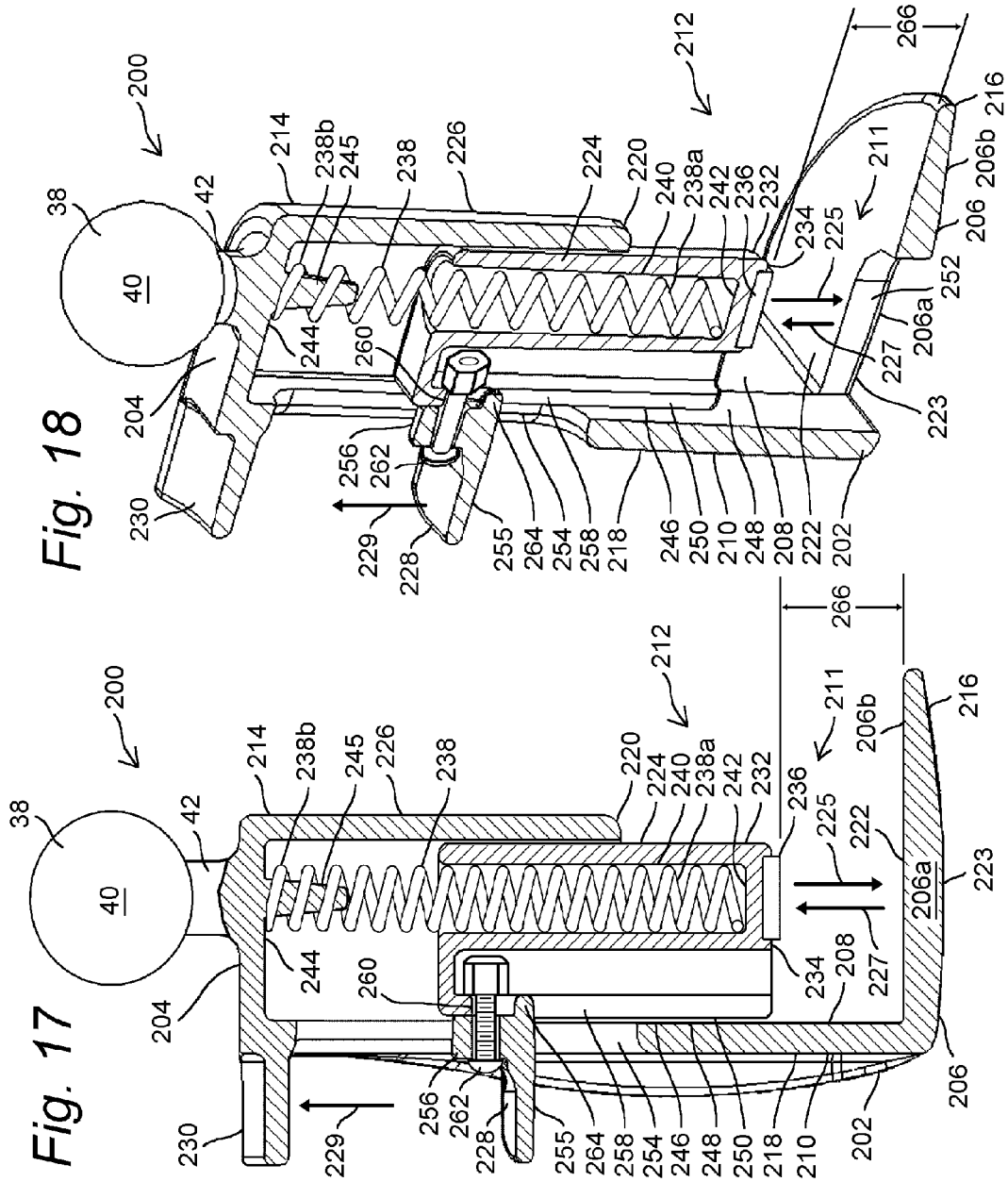
FIGS. 17 and 18 are partial cross-sectional views of the spring-loaded C-clamp device wherein an expansively spring-loading the clamping rod is provided by example and without limitation by an expansively biasing member or compression spring retained in a closed-end bore formed substantially through the clamping rod and aligned along the first clamping and second unclamping directions.

FIGS. 17 and 18 are partial cross-sectional views of the spring-loaded C-clamp device 200 wherein the expansively spring-loading the clamping rod 224 is provided by example and without limitation by an expansively biasing member or compression spring 238 retained in a closed-end bore 240 formed substantially through the clamping rod 224 and aligned along the first clamping and second unclamping directions 225, 227. The closed-end bore 240 is terminated in a first reaction surface 242 formed by the foot portion 232 of the clamping rod 224. The free end 214 of the first opposing arm 204 provides a second reaction surface 244 opposite from the first reaction surface 242. A first end portion 238a of the compression spring 238 is captured in the closed-end bore 240. The free end 214 of the first opposing arm 204 optionally includes a stationary guide 245 positioned to substantially fix and control a second end portion 238b of the compression spring 238.

As illustrated here, the clamping rod 224 is carried in the sleeve 226 of the first arm 204, which constrains the clamping rod 224 for expansive longitudinal movement along the first clamping direction 225 and for retractive longitudinal movement in the opposite second unclamping direction 227. Furthermore, the C-clamp device 200 is optionally formed with a substantially continuous longitudinal guide 246 that is structured for constraining the clamping rod 224 relative to the sleeve 226 for motion substantially along the first and second clamping directions 225, 227. For example, either the sleeve 226 or the shank portion 218 of the frame 202 is optionally formed with a substantially continuous longitudinal slot or keyway 248 that is substantially aligned with the first and second clamping directions 225, 227; and the clamping rod 224 includes a rod or key portion 250 sized for sliding within the keyway 246 along the first and second clamping directions 225, 227.

As illustrated here by example and without limitation, the C-shaped frame 202 and the clamping rod 224 are matably configured for mutual assembly of the clamping rod 224 with the carrying sleeve 226 along the first clamping direction 225. For example, the second arm 206 is formed with a clearance aperture 252 therethrough that is sized to pass the clamping rod 224 along the first clamping direction 225, whereupon the clamping rod 224 is received into the sleeve 226 with the compression spring 238 positioned therebetween, as discussed herein.

Furthermore, the shank portion 218 of the frame 202 is formed with a longitudinal slot 254 extending between the inside 208 and outside 210 thereof The actuator trigger 228 is optionally sized to fit through the slot 254. Else, the actuator trigger 228 is formed with a wide finger grip 255 and a narrower stem or "neck" portion 256 that is sized to pass through and slide lengthwise within the slot 254. After the clamping rod 224 and expansive biasing spring 238 are assembled into the carrying sleeve 226, as discussed herein, the spring 238 is compressed until an aperture 258 in the clamping rod 224 is substantially aligned with the slot 254 in the frame 202. Thereafter, the neck portion 256 of the actuator trigger 228 is fit through the slot 254 in the frame 202, and a transverse clearance aperture 260 through the trigger neck portion 256 is aligned with the aperture 258 in the clamping rod 224. A threaded or other fastener 262 is passed through the clearance aperture 260 and coupled into the clamping rod 224 through the aperture 258 for fixing the actuator trigger 228 to the clamping rod 224 in a position on the outside 210 of the C-shaped frame 202 opposite from the optional stationary reaction structure 230, if present.

A small digit 264 on the neck portion 256 of the actuator trigger 228 is optionally coupled into the clamping rod 224, for example into the aperture 258, for fixing orientation of the actuator trigger 228 relative to the clamping rod 224.

According to one embodiment of the spring-loaded C-clamp device 200, the aperture 258 in the clamping rod 224 is a slot extended along the length of the clamping rod 224 such that the actuator trigger 228 is optionally coupled at different longitudinal locations there along. Accordingly, initial spacing 266 between the forward clamping surface 234 or clamping pad 236 of the clamping rod 224 and the opposing internal surface 222 of the second arm 206 can be varied by moving the actuator trigger 228 along the slot aperture 258 before tightening the fastener 262. This moving the actuator trigger 228 also varies the device clamping pressure by changing compression of the biasing spring 238. Changing initial spring rate of the biasing spring 238 also changes the device clamping pressure.

Figure 19:
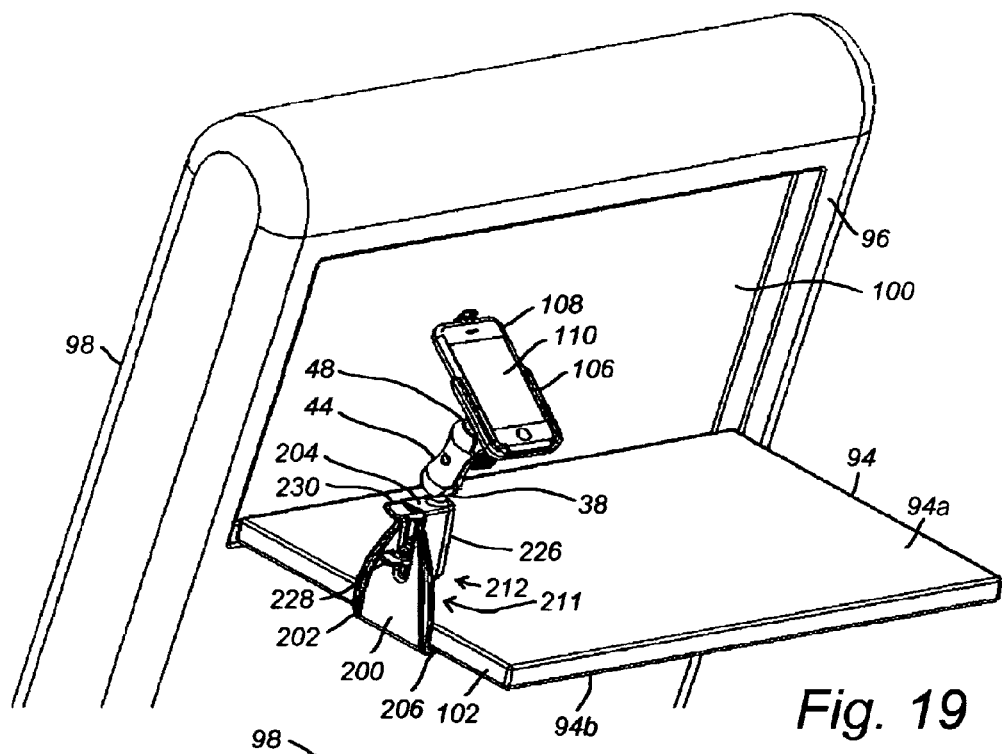
FIG. 19 illustrates another method of operating the spring-loaded C-clamp device as an aviation clamp secured to a fold-out tray table in a deployed configuration relative to a seat back of forward seat.

FIG. 19 illustrates another method of operating the spring-loaded C-clamp device 200 as an aviation clamp. Here, the C-clamp device 200 is secured to fold-out tray table 94 in a deployed configuration relative to seat back 96 of forward seat 98, for example an airplane seat, although this is optionally the forward seat of a modern automobile or pleasure boat. Such a fold-out tray table 94 is often sized to seat at least partially within complementary recess 100 formed in the seat back 96. The mouth opening 211 and throat 212 of the C-shaped frame 202 are fitted over edge portion 102 of the tray table 94, which is illustrated in this example in a folded-out configuration. The C-clamp device 200 is oriented here by example and without limitation with the ball-end coupler 38 extended above a working surface 94a of the tray table 94. The spring-driven clamping rod 224 secures the C-clamp device 200 in position by squeezing the inner surface 222 of the free end 216 of the second arm 206 against backside 94b of the tray table 94. For example, the C-clamp device 200 is used in combination with the combination with the cooperating split-arm socket assembly 44 and second ball-end coupler 48, as described herein, to hold another instrument tray 106 holding another portable electronic instrument 108, such as an Ipod, a portable computer, or DVD player for in-flight viewing of its display screen 110.

Figure 20:
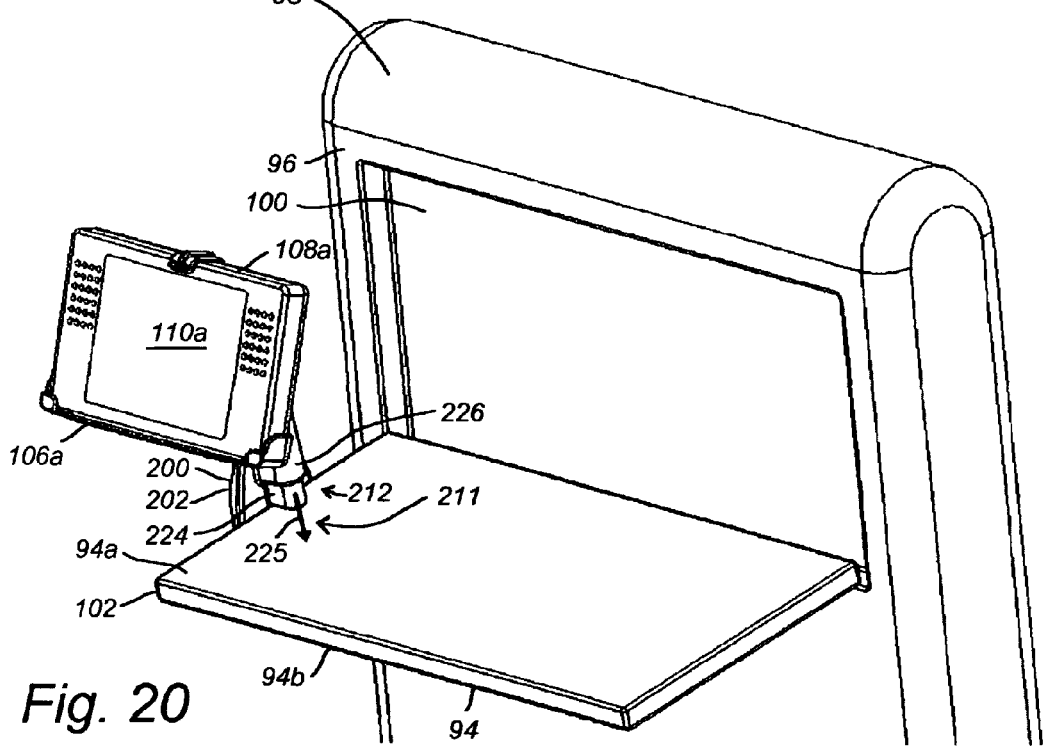
FIG. 20 is a front view of the C-clamp device being operated as an aviation clamp and secured by the spring-driven clamping rod to an edge portion of the deployed fold-out tray table.

FIG. 20 is a front view of the C-clamp device 200 secured by the spring-driven clamping rod 224 to the edge portion 102 of the deployed fold-out tray table 94, as described herein above. The C-clamp device 200 is illustrated here by example and without limitation as cooperating with the split-arm socket assembly 44 and second ball-end coupler 48, as described herein, for holding a different instrument tray 106a for in-flight viewing of a different portable electronic instrument 108a having a different viewing screen 110a.

Figure 21:
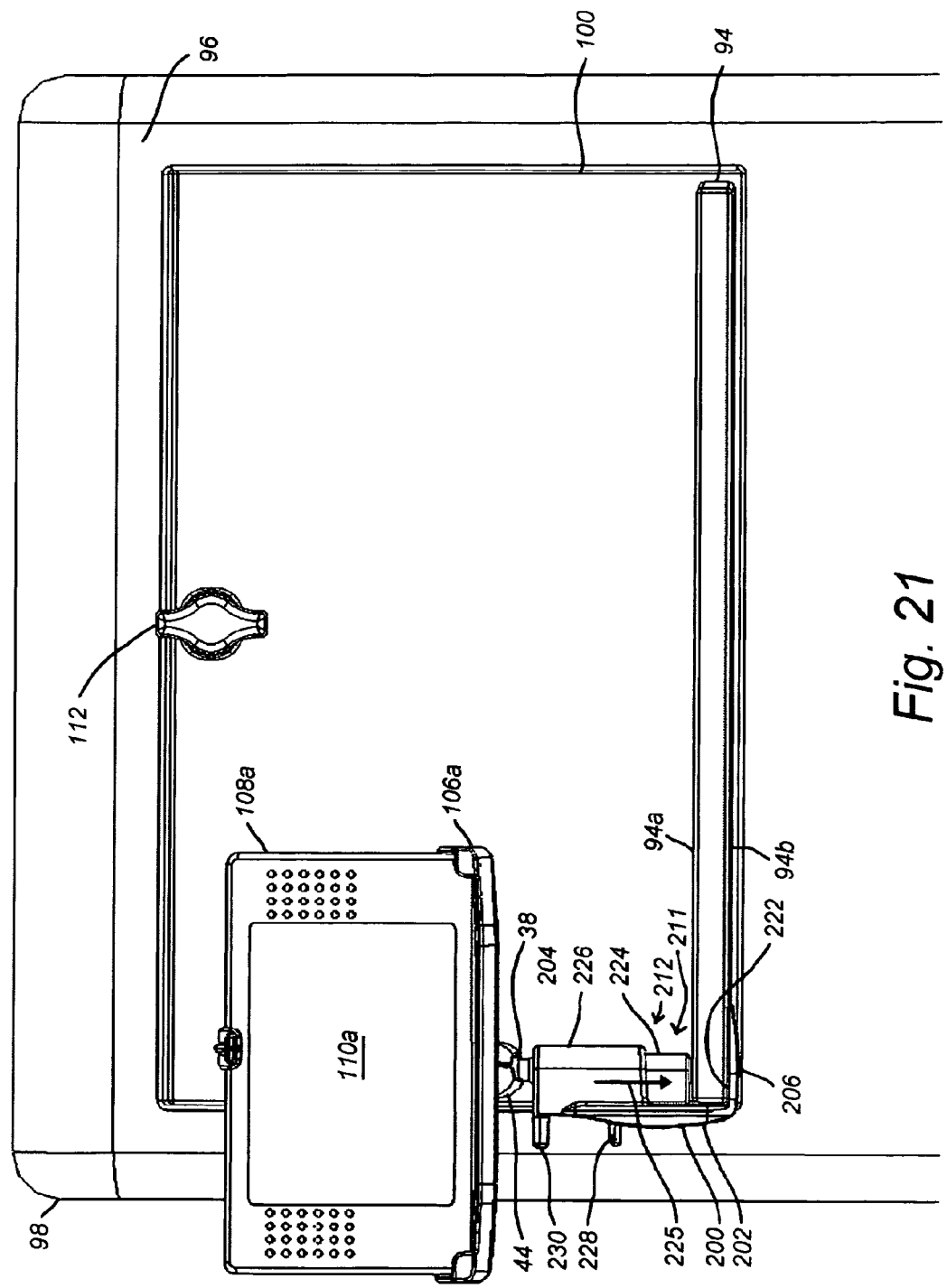
FIG. 21 is another view of the C-clamp device shown in FIG. 20 being operated as an aviation clamp and secured by the spring-driven clamping rod to an edge portion of the deployed fold-out tray table.

FIG. 21 is another view of the C-clamp device 200 shown in FIG. 20 being operated as an aviation clamp. Here, the C-clamp device 200 secured by the spring-driven clamping rod 224 to the edge portion 102 of the deployed fold-out tray table 94, as described herein above.

Figure 22:
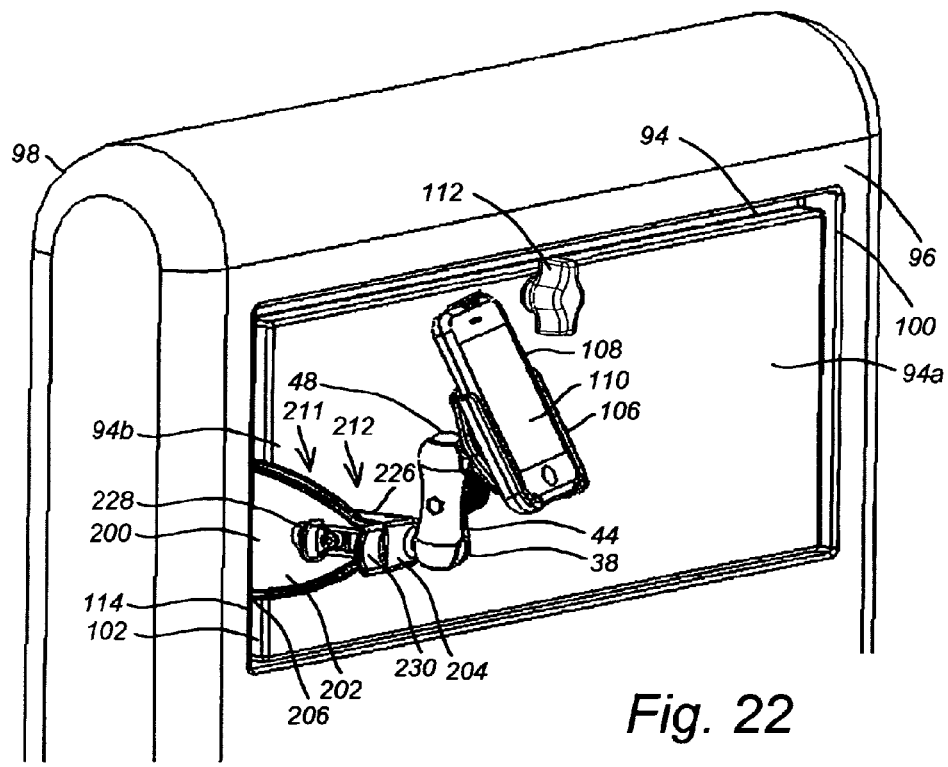
FIG. 22 illustrates yet another method of operating the C-clamp device as an aviation clamp being secured to the fold-out tray table as stored in an upright and locked configuration relative to the seat back of the forward seat.

FIG. 22 illustrates yet another method of operating the C-clamp device 200 as an aviation clamp. Here, the C-clamp device 200 is secured to the fold-out tray table 94 stored in an upright and locked configuration relative to the seat back 96 of the forward seat 98, for example an airplane seat, although this is optionally the forward seat of a modern automobile or pleasure boat. The mouth opening 211 and throat 212 of the C-shaped frame 202 are fitted over the edge portion 102 of the tray table 94. Here, the C-clamp device 200 is oriented here by example and without limitation with the ball-end coupler 38 extended above the backside surface 94b of the tray table 94. The spring-driven clamping rod 224 secures the C-clamp device 200 in position by squeezing the inner surface 222 of the free end 216 of the second arm 206 against the working surface 94a of the tray table 94. Here, the novel shape of the frame 202 of the C-clamp device 200 is used to good advantage. As discussed herein, the second arm 206 is slim to fit into narrow passages. Here, the slim second arm 206 is thin enough that it does not interfere with closure of the tray table 94 against the seat back 96 of the forward seat 98, and even permits securing a tray table locking knob 112, while in the C-clamp device 200 remains secured to the tray table edge portion 102.

Furthermore, as discussed herein, the second arm 206 is slender such that it fits in narrow gap 114 between the tray table edge portion 102 and the seat back 96 when the tray table 94 is fit into the complementary recess 100. Furthermore, the free end 216 of the second arm 206 is slender such that it fits in the recess 100 between the working surface 94a of the tray table 94 and the seat back 96. In contrast, a conventional C-clamp design does not permit closure of the tray table 94 into the confined space of the complementary recess 100. Rather, conventional C-clamp type devices generally have a thin flat anvil plates disposed on a thick stiffener formed by a heavy strong back between the anvil and a threaded drive head holding a threaded drive rod. Typically, the strong back must be thick to adequately support the force generated by the drive rod. Here, the thumb screws 22 are conventional thumb screws, in contrast to the square power threads and T-handle typical of C-clamps and vices. The clamping rod 224 (more clearly shown in earlier Figures) is spring-driven such that the forces generated by releasing the expansive biasing spring 238 are minimal as compared with conventional C-clamp devices because the C-clamp device 200 is expected to support minimal loads. Optionally, the forward clamping surface 234 of the foot portion 232 of the spring-driven clamping rod 224 includes the plastic or nylon clamping pad 236 to avoid scratching clamping surfaces.

Thus, the C-clamp device 200 is used in combination with the combination with the cooperating split-arm socket assembly 44 and second ball-end coupler 48, as described herein, to hold the portable computer, DVD player or other portable electronic instrument 108 in the instrument tray 106 with its display screen 110 positioned for in-flight viewing, even when the tray table 94 is stored in its upright and locked position relative to the seat back 96.

Figure 23:
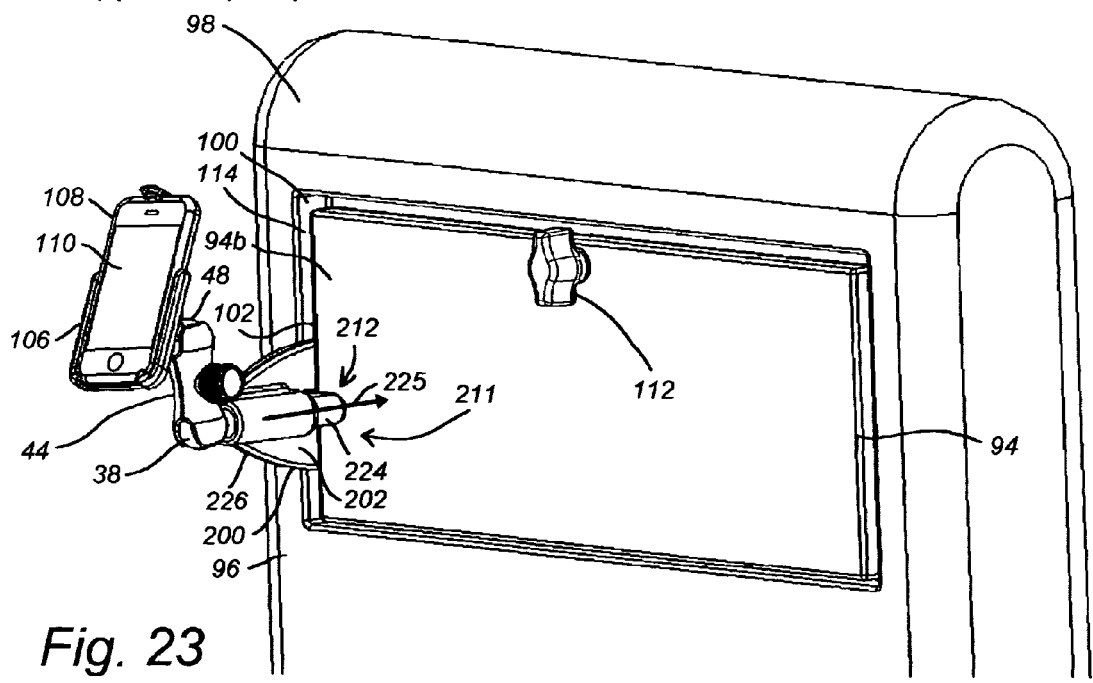
FIG. 23 is another view of the C-clamp device being operated as an aviation clamp and being secured by the spring-driven clamping rod to the edge portion of the tray table while stored in its upright and locked position relative to the forward seat back.

FIG. 23 is another view of the C-clamp device 200 secured by the spring-driven clamping rod 224 to the edge portion 102 of the tray table 94 while stored in its upright and locked position relative to the seat back 96, as described herein above. The C-clamp device 200 is illustrated here by example and without limitation as cooperating with the split-arm socket assembly 44 and second ball-end coupler 48, as described herein, for holding instrument tray 106 for in-flight viewing of the portable computer, DVD player or other portable electronic instrument 108.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A clamp device, comprising:
   a C-shaped frame comprising first and second substantially opposing interconnected arms, the first arm further comprising a sleeve aligned along a clamping direction oriented substantially transverse of the second arm and having a longitudinal slot formed through the C-shaped frame substantially along the clamping direction between the first and second arms, and the second arm further comprising a substantially flat anvil portion that is oriented substantially transverse of the clamping direction;
   a clamping rod carried in the sleeve of the first arm and being expansively biased relative thereto for longitudinal movement in a first clamping direction toward an internal face of the second arm, the clamping rod further comprising an actuator received through the longitudinal slot formed through the C-shaped frame and sized to slide there along; and
   a coupler projected from an external portion of the frame.

2. The clamp device of claim 1 wherein the coupler further comprises a substantially spherical coupler.

3. The clamp device of claim 1 wherein the clamping rod is further slidingly received in the sleeve.

4. The clamp device of claim 3, further comprising an expansive biasing member coupled between the clamping rod and the sleeve.

5. The clamp device of claim 4 wherein the clamping rod further comprises a bore substantially therethrough and aligned substantially along the first clamping direction, the expansive biasing member residing at least partially within the bore.

6. The clamp device of claim 5 wherein the clamping rod further comprises a foot positioned adjacent to a terminal portion of the bore and facing the internal face of the second arm.

7. The clamp device of claim 6 wherein the second arm further comprises a clearance aperture that is substantially aligned with the sleeve of the first arm and sized to receive the clamping rod therethrough.

8. A clamp device, comprising:
   a C-shaped frame comprising first and second substantially opposing arms interconnected by an intermediate shank portion therebetween, the first arm further comprising a substantially hollow carrier sleeve aligned substantially along a clamping direction oriented substantially transverse of the second arm with a longitudinal slot formed through the C-shaped frame between the first and second arms, and the second arm further comprising a thin and flat anvil portion positioned opposite from the carrier sleeve and further comprising an interior clamping surface that is oriented substantially transverse of the clamping direction;
   a clamping rod carried in the hollow of the sleeve for longitudinal movement in the clamping direction toward an internal face of the second arm and in an opposite unclamping direction away from the second arm, the clamping rod further comprising an actuator received through the longitudinal slot formed through the C-shaped frame and sized to slide there along;
   wherein the second arm further comprises a clearance aperture therethrough and substantially aligned with the clamping and unclamping directions and sized to receive the clamping rod therethrough;
   an expansive biasing member coupled for expanding the clamping rod for longitudinal movement along the clamping direction; and
   a coupler projected on a stem from an external portion of the frame.

9. The clamp device of claim 8, further comprising a guide mechanism structured for guiding the clamping rod for longitudinal movement in the clamping and unclamping directions.

10. The clamp device of claim 9 wherein the guide mechanism further comprises a keyway and mating key coupled between the shank portion of the C-shaped frame and the clamping rod.

11. The clamp device of claim 8 wherein the clamping rod further comprises a longitudinal bore substantially aligned along the clamping and unclamping directions, and a first end portion of the expansive biasing member residing substantially therein.

12. The clamp device of claim 8 wherein the first arm further comprises a stationary guide positioned within the hollow of the carrier sleeve, and a second opposite end portion of the expansive biasing member being positionally coupled to the guide.

13. The clamp device of claim 10 wherein the longitudinal slot formed therethrough between the first and second arms of the C-shaped frame further substantially intersects the keyway of the guide mechanism; and the clamping rod further comprises a key portion sized to slide there along.

14. The clamp device of claim 13 wherein the actuator further comprises a stem portion sized to slide along the longitudinal slot of the C-shaped frame, the actuator being coupled to the clamping rod.

15. The clamp device of claim 14, further comprising means for adjusting a position of the actuator along the clamping rod between first and second end portions thereof.

16. A method of clamping, the method comprising:
interconnecting first and second substantially opposing arms into a C-shaped frame and forming a throat portion of the frame therebetween, in the C-shaped frame between the first and second arms forming a longitudinal slot, in the first arm further forming a substantially hollow carrier sleeve aligned substantially along a clamping direction oriented substantially transverse of the second arm, and in the second arm further forming an anvil portion positioned opposite from the carrier sleeve and further forming a substantially flat interior clamping surface thereon that is oriented substantially transverse of the clamping direction;

inserting a clamping rod into the hollow of the carrier sleeve through a clearance aperture formed through the second arm and substantially aligned with the clamping direction, and further comprising inserting an actuator portion of the clamping rod into the longitudinal slot in the C-shaped frame for sliding there along;

in the hollow of the carrier sleeve, carrying the clamping rod for longitudinal movement in the clamping direction toward the internal face of the second arm and in an opposite unclamping direction away from the second arm;

positioning a target mounting structure in the throat portion of the frame between a forward clamping surface of the clamping rod and the internal face of the second arm;

resiliently expanding the clamping rod longitudinally along the clamping direction; and compressively clamping the target mounting structure between the forward clamping surface of the clamping rod and the internal face of the second arm.

17. The method of claim 16, further comprising guiding the clamping rod relative to the hollow of the carrier sleeve.

18. The method of claim 16 wherein resiliently expanding the clamping rod further comprises adjustably positioning the actuator portion relative to the clamping rod along the clamping direction.

19. The method of claim 16, further comprising projecting a substantially spherical coupler from a portion of the frame external of the throat portion.

\* \* \* \* \*